United States Patent
Hatahori et al.

(10) Patent No.: US 11,815,493 B2
(45) Date of Patent: Nov. 14, 2023

(54) DEFECT INSPECTION APPARATUS AND DEFECT INSPECTION METHOD

(71) Applicant: Shimadzu Corporation, Kyoto (JP)

(72) Inventors: Takahide Hatahori, Kyoto (JP); Kenji Takubo, Kyoto (JP); Koki Yoshida, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 404 days.

(21) Appl. No.: 17/413,374

(22) PCT Filed: Dec. 20, 2018

(86) PCT No.: PCT/JP2018/046946
§ 371 (c)(1),
(2) Date: Jun. 11, 2021

(87) PCT Pub. No.: WO2020/129209
PCT Pub. Date: Jun. 25, 2020

(65) Prior Publication Data
US 2022/0026396 A1     Jan. 27, 2022

(51) Int. Cl.
  *G01N 29/24*    (2006.01)
  *G01N 29/06*    (2006.01)
  *G01N 29/04*    (2006.01)

(52) U.S. Cl.
  CPC ....... *G01N 29/2418* (2013.01); *G01N 29/043* (2013.01); *G01N 29/0609* (2013.01);
  (Continued)

(58) Field of Classification Search
  CPC ........... G01N 29/2418; G01N 29/0609; G01N 29/0654; G01N 2291/023;
  (Continued)

(56) References Cited

U.S. PATENT DOCUMENTS 4,046,477 A * 9/1977 Kaule ............... G01B 9/02
                                    356/35.5
4,581,939 A * 4/1986 Takahashi ........ G01N 29/2418
                                     356/432
(Continued)

FOREIGN PATENT DOCUMENTS

JP    H07333170 A    12/1995
JP    H11002611      1/1996
(Continued)

OTHER PUBLICATIONS

Written Opinion for PCT application PCT/JP2018/046946 dated Mar. 19, 2019 by the International Search Authority submitted with a machine translation.
(Continued)

*Primary Examiner* — Lisa M Caputo
*Assistant Examiner* — Rose M Miller
(74) *Attorney, Agent, or Firm* — Muir Patent Law, PLLC

(57) ABSTRACT

A defect inspection apparatus (100) is provided with and an excitation unit (1) for exciting elastic waves, an irradiation unit (2) for emitting laser light, a measurement unit (3) for measuring interference light, and a control unit (4). The control unit is configured to acquire an image (61) representing a vibration state of an inspection target object (7) in a measurement area based on a measurement result of the measurement unit (3), detect a discontinuous portion in a vibration state in the measurement area from the image representing the vibration state as a defect (73), and identify a type of the defect based on at least one of a shape (62) of the detected defect and the vibration state of a defective portion.

6 Claims, 5 Drawing Sheets

(52) U.S. Cl.
CPC ... *G01N 29/0654* (2013.01); *G01N 2291/023* (2013.01); *G01N 2291/0289* (2013.01)

(58) Field of Classification Search
CPC ......... G01N 2291/0289; G01N 29/043; G01N 21/1702; G01N 21/1706
USPC .......................................... 73/588, 643, 602
See application file for complete search history.

(56) References Cited

U.S. PATENT DOCUMENTS

| | | | | |
|---|---|---|---|---|
| 5,982,482 A | * | 11/1999 | Nelson | G01N 29/2418 356/237.1 |
| 7,987,718 B2 | * | 8/2011 | Huber | B81C 99/005 73/579 |
| 8,113,056 B2 | * | 2/2012 | Drake, Jr. | G01N 21/1702 73/657 |
| 10,267,618 B2 | * | 4/2019 | Hatahori | G01M 7/00 |
| 11,193,887 B2 | * | 12/2021 | Hatahori | G01M 5/0033 |
| 11,226,294 B2 | * | 1/2022 | Hatahori | G01N 21/8851 |
| 2003/0037616 A1 | * | 2/2003 | Vikhagen | G01B 9/02041 73/643 |
| 2003/0150272 A1 | * | 8/2003 | Janik | G01N 29/348 73/643 |
| 2015/0233870 A1 | * | 8/2015 | Prinzhorn | G01B 17/025 73/643 |
| 2017/0350690 A1 | | 12/2017 | Hatahori et al. | |
| 2022/0051390 A1 | * | 2/2022 | Yoshida | G01N 29/0609 |
| 2022/0180500 A1 | * | 6/2022 | Yoshida | G09G 3/006 |
| 2022/0229020 A1 | * | 7/2022 | Hatahori | B23K 31/00 |
| 2023/0062821 A1 | * | 3/2023 | Yoshida | G01N 21/88 |
| 2023/0085940 A1 | * | 3/2023 | Hatahori | G01N 21/45 382/141 |

FOREIGN PATENT DOCUMENTS

| | | |
|---|---|---|
| JP | 2002222281 A | 8/2002 |
| JP | 2015038441 A | 2/2015 |
| JP | 2017219318 A | 12/2017 |
| WO | 2017221706 A1 | 12/2017 |

OTHER PUBLICATIONS

Nakajima, "Vibration Analysis by Holography", Applied Physics vol. 41, No. 6 (1972) pp. 560 (20)-573 (33) submitted with a machine translation.

* cited by examiner

DEFECT INSPECTION APPARATUS AND DEFECT INSPECTION METHOD

TECHNICAL FIELD

The present invention relates to a defect inspection apparatus and a defect inspection method.

BACKGROUND ART

Conventionally, a defect inspection apparatus and a defect inspection method are known. A defect inspection apparatus and a defect inspection method are disclosed, for example, in Japanese Unexamined Patent Application Publication No. 2017-219318.

The above-described Japanese Unexamined Patent Application Publication No. 2017-219318 discloses a defect inspection apparatus provided with an excitation unit for exciting elastic waves in an inspection target object and an illumination unit for performing stroboscopic illumination in a measurement area on a surface of an inspection target object, and a displacement measurement unit. The displacement measurement unit is configured to collectively measure the displacement of each measurement area point in the front-back direction in at least three phases mutually different in the elastic wave by controlling the phase of the elastic wave and the stroboscopic illumination timing. The defect inspection apparatus of Japanese Unexamined Patent Application Publication No. 2017-219318 generates an image representing the difference in the vibration displacement by the difference in the brightness and darkness of the image based on the vibration state (amplitude and phase) at each measurement area point and detects the discontinuous portion of the vibration state as a defect by performing a visual inspection or image processing to this image.

PRIOR ART DOCUMENT

Patent Document

Patent Document 1: Japanese Unexamined Patent Application Publication No. 2017-219318

SUMMARY OF THE INVENTION

Problems to be Solved by the Invention

In the defect inspection apparatus described in Japanese Unexamined Patent Application Publication No. 2017-219318 generates an image representing the difference in the vibration displacement by the difference in the brightness and darkness of the image based on the vibration state (amplitude and phase) at each point in the measurement area and detects a discontinuous portion in the vibration state as a defect by performing a visual inspection or image processing with respect to this image. As for the type of the defect, it is, however, required for an inspector to determine by a visual inspection. For this reason, there is an inconvenience that it is difficult for an unskilled inspector who does not have enough knowledge about a spatial distribution image (image representing a vibration state of an inspection target object) in a vibration state to determine the type of the defect. Therefore, there is a problem that it is difficult to easily determine the type of the detected defect.

The present invention has been made to solve the above-mentioned problems. An object of the present invention is to provide a defect inspection apparatus and a defect inspection method capable of easily determining a type of a detected defect.

Means for Solving the Problem

A defect inspection apparatus according to a first aspect of the present invention includes:
an excitation unit configured to excite elastic waves in an inspection target object;
an irradiation unit configured to emit laser light to a measurement area of the inspection target object in a state in which the elastic waves are excited by the excitation unit;
a measurement unit configured to cause the laser light reflected at mutually different positions in the measurement area to interfere with each other to acquire interference light and measure the interference light; and
a control unit, the control unit being configured to
acquire an image representing a vibration state of the inspection target object in the measurement area based on a measurement result of the measurement unit,
detect a discontinuous portion in the vibration state in the measurement area from the image representing the vibration state as a defect, and
identify a type of the defect based on at least one of a shape of the detected defect and the vibration state of a defective portion.

In the defect inspection apparatus according to the first aspect of the present invention, it is provided with a control unit for identifying the type of the defect based on at least one of the shape of the detected defect and the vibration state of the defective portion. With this, the control unit automatically identifies the type of the defect, which eliminates the need for the inspector to identify the type of the defect from the image representing the vibration state. Consequently, even for an unskilled inspector who does not have enough knowledge about a spatial distribution image, it is possible to easily determine the type of the detected defect from the image indicating the vibration state.

A defect inspection method according to the second aspect of the present invention, a defect inspection method includes:
exciting elastic waves in an inspection target object;
emitting laser light to a measurement area of the inspection target object in a state in which the elastic waves are excited;
causing the laser light reflected at mutually different positions in the measurement area to interfere with each other to acquire interference light and measuring the interference light;
acquiring an image representing a vibration state of the inspection target object in the measurement area based on a measurement result;
detecting a discontinuous portion in the vibration state in the measurement area from the image representing the vibration state as a defect; and
identifying a type of the defect based on at least one of a shape of the detected defect and the vibration state of a defective portion.

In the defect inspection method according to the second aspect of the present invention, the type of the defect is detected based on at least one of the shape of the detected defect and the vibration state of the defective portion. With this, the control unit automatically performs the identification of the type of the defect, which eliminates the operation for identifying the type of the defect by an inspector from the image indicating the type of the defect. As a result, it is possible to provide a defect inspection apparatus capable of easily determining the type of the detected defect even by an unskilled inspector who does not have background knowledge.

Effects of the Invention

According to the present invention, as described above, it is possible to provide a defect inspection apparatus and a defect inspection method capable of easily determining the type of the detected defect.

EMBODIMENTS FOR CARRYING OUT THE INVENTION

Figure 1:
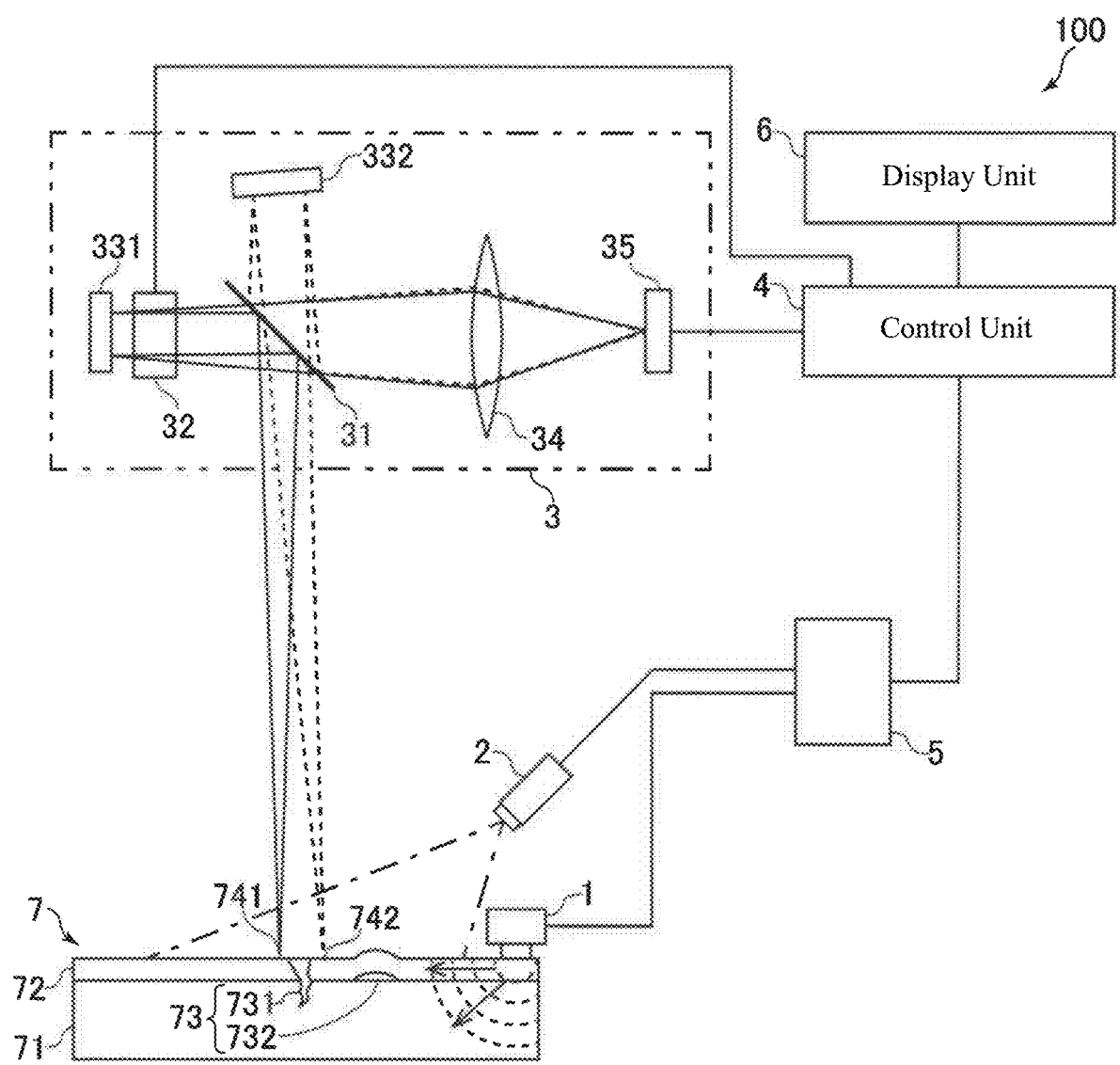
FIG. 1 is a schematic diagram showing the entire configuration of a defect inspection apparatus according to an embodiment of the present invention.

Hereinafter, embodiments in which the present invention is embodied will be described with reference to the attached drawings.

Configuration of Defect Inspection Apparatus

First, referring to FIG. 1, a configuration of a defect inspection apparatus 100 according to a first embodiment will be described.

The defect inspection apparatus 100 of this embodiment is provided with a vibrator 1, a laser illumination unit 2, a speckle-shearing interferometer 3, a control unit 4, a signal generator 5, and a display unit 6. Note that the vibrator 1 is an example of the "excitation unit" recited in claims, and the laser illumination unit 2 is an example of the "illumination unit" recited in claims. The speckle-shearing interferometer 3 is an example of the "measurement unit" recited in claims.

The vibrator 1 and the laser illumination unit 2 are connected to the signal generator 5 via cables.

The vibrator 1 receives an alternating electrical signal from the signal generator 5 and excites elastic waves to the inspection target object 7. The vibrator 1 is arranged so as to be in contact with the inspection target object 7 and is configured to convert the alternating electrical signal from the signal generator 5 into mechanical vibrations and excite elastic waves to the inspection target object 7.

The laser illumination unit 2 receives an electric signal from the signal generator 5 and emits laser light. The laser illumination unit 2 includes a laser light source and an illumination light lens (not shown). The illumination light lens spreads the laser light emitted from the laser light source to the entire measurement area on the surface of the inspection target object 7.

The speckle-shearing interferometer 3 includes a beam splitter 31, a phase shifter 32, a first reflecting mirror 331, a second reflecting mirror 332, a condenser lens 34, and an image sensor 35.

The beam splitter 31 is a half mirror and is arranged at a position on which the laser light reflected by the surface of the inspection target object 7 is incident.

The first reflecting mirror 331 is arranged at an angle of 45 degrees with respect to the reflection surface of the beam splitter 31 on the optical path of the laser light reflected by the beam splitter 31.

The second reflecting mirror 332 is arranged at an angle slightly inclined from an angle of 45 degrees with respect to the reflection surface of the beam splitter 31 on the optical path of the laser light transmitted through the beam splitter 31.

The phase shifter 32 is disposed between the beam splitter 31 and the first reflecting mirror 331 and is configured to change (shift) the phase of the transmitted laser light by the control of the control unit 4.

The image sensor 35 has a large number of detecting elements and is arranged on the optical path of the laser light (see the straight line in FIG. 1) reflected by the first reflecting mirror 331 after being reflected by the beam splitter 31 and transmitted the beam splitter 31 and the laser light (see the broken line in FIG. 1) reflected by the beam splitter 31 after being transmitted the beam splitter 31 and reflected by the second reflecting mirror 332.

The condenser lens 34 is arranged between the beam splitter 31 and the image sensor 35 to converge the laser light transmitted through the beam splitter 31 (see the straight line in FIG. 1) and the laser light reflected by the beam splitter 31 (see the broken line in FIG. 1).

The laser light (see the straight line in FIG. 1) reflected at the A point 741 on the surface of the inspection target object 7 and the first reflecting mirror 331 and the laser light (see the broken line in FIG. 1) reflected by the B point 742 on the surface of the inspection target object 7 and the second reflecting mirror 332 interfere with each other and are incident on the same portion of the image sensor 35.

The control unit 4 operates the phase shifter 32 arranged in the speckle-shearing interferometer 3 with an actuator (not shown) to change the phase of the transmitting laser light. With this, the phase difference between the laser light reflected at the point A 741 and the laser light reflected at the point B 742 changes. Each detecting element of the image sensor 35 detects the intensity of the interference light in which these two laser light are interfered.

The control unit 4 controls the vibration of the vibrator 1 and the timing of the irradiation of the laser light of the laser illumination unit 2 via the signal generator 5 and captures an image while changing the phase shift amount. A total of 37 images are captured while changing the phase shift amount by $\lambda/4$. The images include 32 images at the timing j (j=0 to 7) of the laser irradiation at each phase shift amount (0, $\lambda/4$, $\lambda/2$, $3\lambda/4$) and 5 images when the lamp is turned off before and after each phase shift amount (0, $\lambda/4$, $\lambda/2$, $3\lambda/4$). Note that $\lambda$ denotes a wavelength of the laser light L.

The control unit 4 processes the detection signal from each detecting element as follows to acquire an image (spatial distribution image in a vibration state) 61 representing the vibration state.

From the luminance values Ij0 to Ij3 of images (4 images each) the same in the timing j (j=0 to 7) and different in the phase shift amount by λ/4, the optical phase (phase difference between two optical paths when the phase shift amount is zero) (Φj is acquired using Expression (1).

$$\Phi j=-\arctan\{(Ij3-Ij1)/(Ij2-Ij0)\} \quad (1)$$

For the optical phase Φj, a sine wave approximation is performed by the least-squares method, and the approximate coefficients A, θ, and C in Expression (2) are acquired.

$$\Phi j=A\cos(\theta+j\pi/4)+C=B\exp(j\pi/4)+C \quad (2)$$

where B is a complex amplitude and is expressed by Expression (3).

$$B=A\exp(i\theta) \text{ Complex amplitude} \quad (3)$$

Here, the complex amplitude B is the image information (two-dimensional spatial information of the complex amplitude) for the base to output the image 61 representing the vibration state. From the approximate expression obtained by removing the constant term C from Expression (2), an image 61 constituting a moving image (30 to 60 frames) that displays the optical phase change at each phase times ξ (0≤ξ<2π) of the vibration is output. In the above-described process, a spatial filter may be applied appropriately on the complex amplitude B for the noise elimination. Note that the phase shift amount or the step of the laser irradiation timing (in the above-described example, λ/4 and T/8, respectively, where T is a vibration period) is not limited thereto. In this case, the calculation expression is different from the above-described Expressions (1) to (3).

The control unit 4 applies a spatial filter to detect the discontinuous area in a vibration state as a defect 73 of the inspection target object 7 from the image 61 representing the above-described vibration state. At this time, in a case where the shape of the inspection target object 7 itself includes irregularities, even at the boundary between a plane portion and an uneven portion, there sometimes occurs vibration state discontinuity. In order not to detect it as a defect, it may be configured to detect a defect 73, considering the shape information of the inspection target object 7. Alternatively, it may be configured to detect the defect 73 using image information serving as a base for outputting the image 61.

The control unit 4 extracts the shape of the spatial distribution of the defect 73, detected from the image 61 representing the vibration state, as the shape 62 of the defect. Thereafter, the type of the defect is identified from the shape.

Specifically, the parameter or the indicator represented by the ratio of the area of the shape 62 of the extracted defect to the perimeter is calculated in advance. Based on the parameter or the indicator, in a case where the shape 62 of the defect is linear, the type of the defect is identified as a crack, and in a case where the shape 62 of the defect is planar, the type of the defect is identified as a delamination.

Further, the vibration state of the defective portion may be used to identify the type of the defect. For example, in the case of a delamination, in a case where the amplitude is increased and the delamination area is large, there is a case in which an effect of shortening the wavelength occurs. From such a vibration state of the defective portion, the type of the defect may be identified, or the type of the defect may be identified based on both the shape 62 of the defect and the vibration state of the defect.

The control unit 4 generates an image in which the defect type indication 63 corresponding to the type of the identified defect and the shape 62 of the defect are combined and displays it on the display unit 6.

The display unit 6 displays the image 61 representing the vibration state of the inspection target object 7 generated by the control unit 4, the image 621 indicating the shape of the defect, and the defect type indication 63.

The inspection target object 7 is a coated steel sheet in which a coating film 72 is coated on a surface of a steel sheet 71. The inspection target object 7 includes a defect 73 (crack 731 and delamination 732).

Image Indicating Vibration State and Display Image of Display Unit

Figure 2:
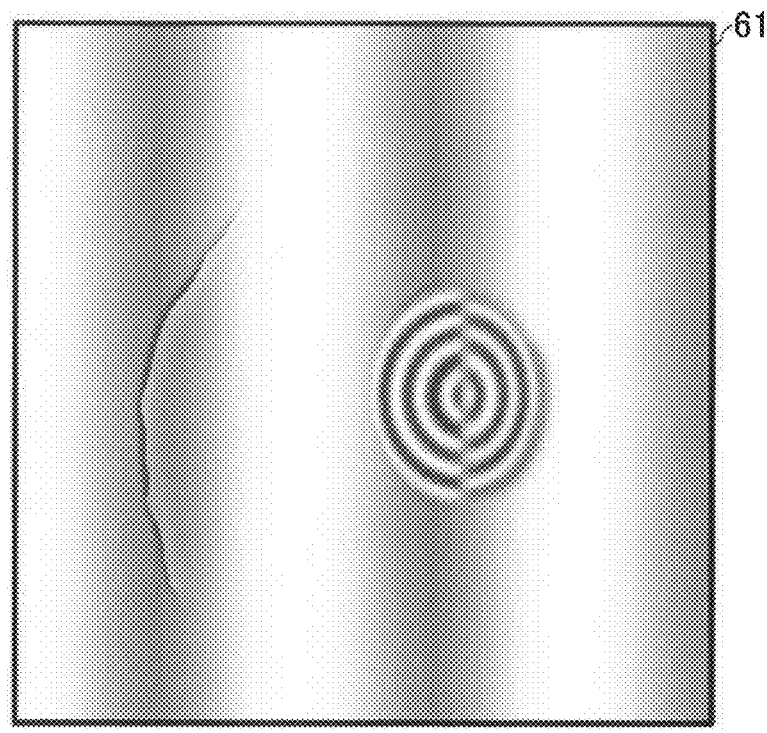
FIG. 2 is a diagram illustrating an example of an image representing the vibration state obtained by a control unit of the defect inspection apparatus according to one embodiment of the present invention.
Figure 3:
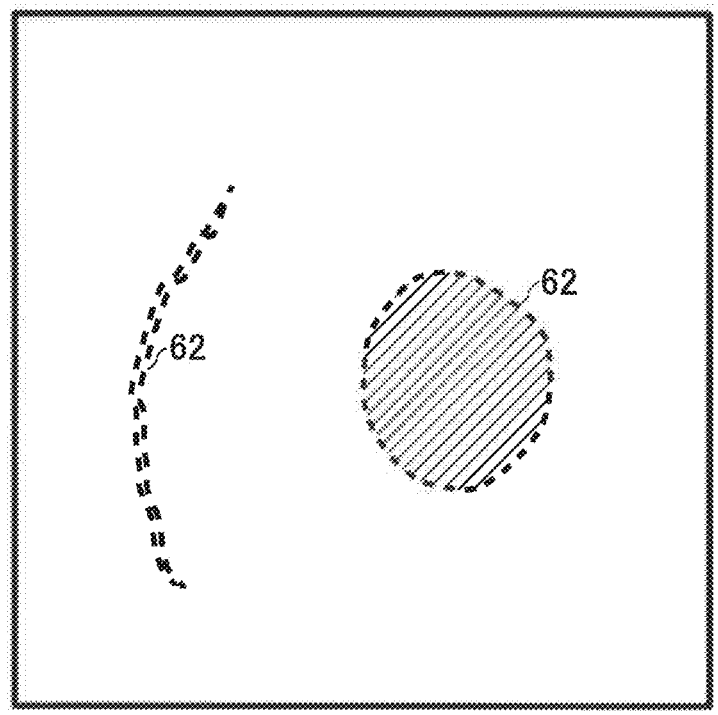
FIG. 3 shows an example of a shape of a defect extracted by the control unit of the defect inspection apparatus according to one embodiment of the present invention.
Figure 4:
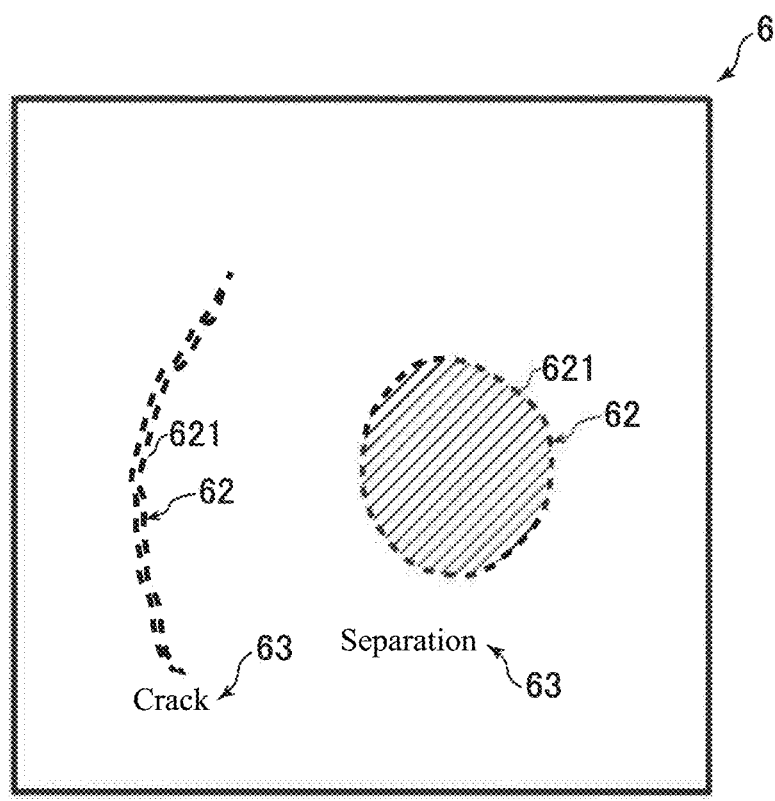
FIG. 4 is a diagram showing an example of an image in which an image indicating the shape of the defect type displayed on the display unit and a defect type indication according to one embodiment of the present invention are combined.

Referring to FIG. 2 to FIG. 4, the display unit 6 of each image and the display unit 6 will be described.

An example of the image 61 representing the vibration state obtained from the control unit 4 is shown in FIG. 2. The vibration state discontinuous portion of the image 61 representing this vibration state is detected by the control unit 4 as a defect 73.

The shape 62 of the defect extracted by the control unit 4 is shown in FIG. 3. The shape 62 of the defect is obtained by extracting the spatial distribution of the defect 73 detected by the control unit 4. The type of the result is identified based on the area (the area of the inside of the hatched shape 62) of the shape 62 in this defect and the face length (the length of the dashed line of the shape 62).

An image in which the shape 62 of the defect and the defect type indication 63 to be displayed on the display unit 6 are combined is shown in FIG. 4. The defect type indication 63 displays the type of the defect identified above, and displays the type of the defect by characters, such as, e.g., delamination and crack. Further, the shape 62 of the defect is a spatial distribution of the defect 73 extracted by the control unit 4.

Defect Type Identification Processing

Next, referring to FIG. 5, the defect type identification processing by the defect inspection apparatus 100 of the first embodiment will be described based on a flowchart. Note that the defect type identification processing is performed by the control unit 4.

Figure 5:
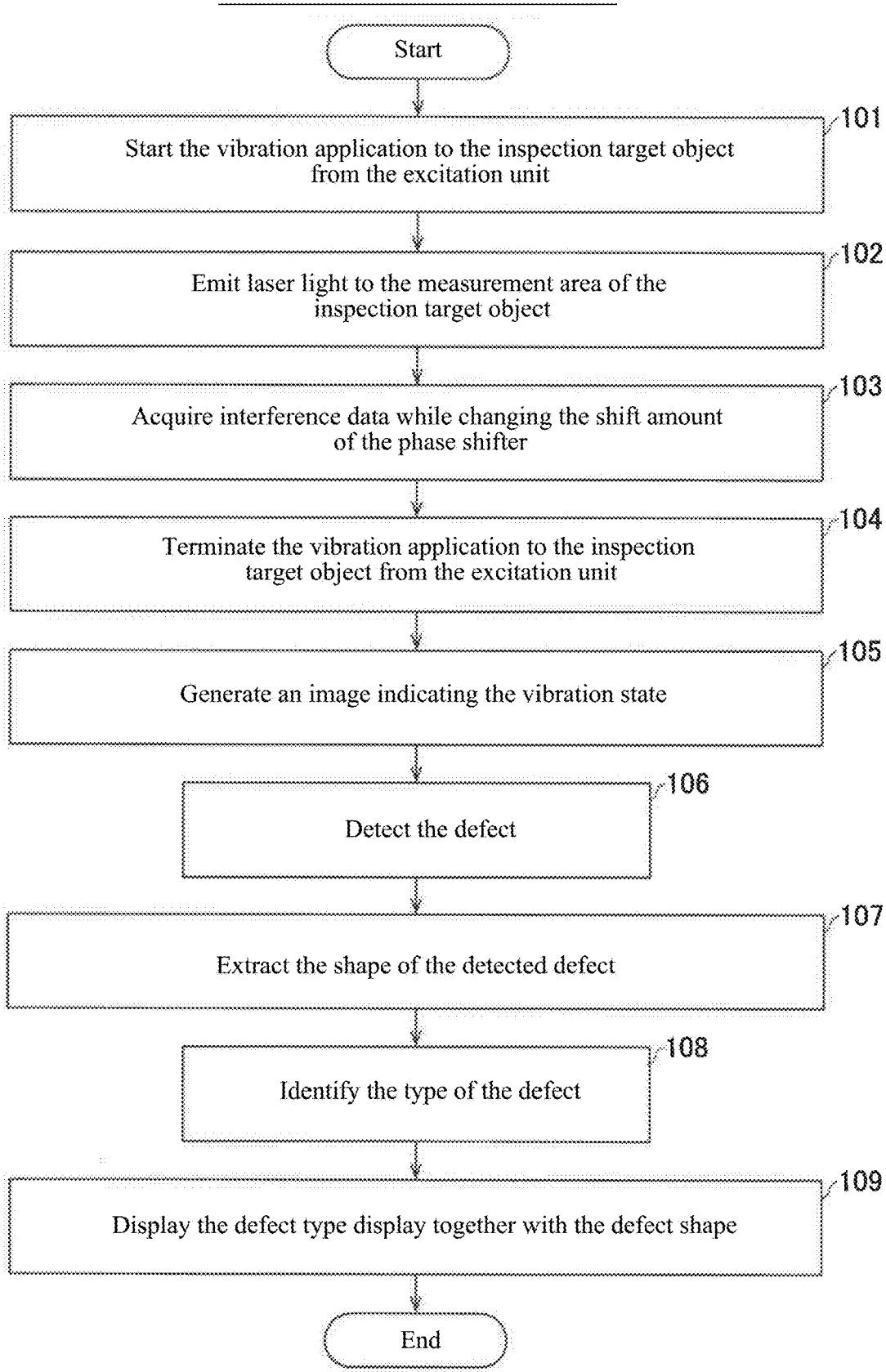
FIG. 5 is a flowchart for explaining defect type identification processing by the control unit of the defect inspection apparatus according to one embodiment of the present invention.

As shown in FIG. 5, first, in Step 101, the vibration application from the vibrator 1 (excitation unit) to the inspection target object 7 is started. With this, the elastic waves are excited in the inspection target object 7.

Then, in Step 102, laser light is emitted from the laser illumination unit 2 to the measurement area of the inspection target object 7.

Then, in Step 103, the phase shifter 32 of the speckle-shearing interferometer 3 is operated so that the shift amount of the phase shifter 32 changes by λ/4, and the intensity of the interference light of the laser light at each phase is detected by the image sensor 35. The detection signal from the detecting element of the image sensor 35 is processed in the control unit 4. After completion of the acquisition of all phase data, the process proceeds to Step 104.

In Step 104, the vibration application from the vibrator 1 (excitation unit) to the inspection target object 7 is completed.

Then, in Step 105, an image (spatial distribution image of the vibration state) 61 representing the vibration state is generated.

In Step 106, the defect 73 is detected from the image 61 representing the vibration state generated in Step 105.

In Step 107, the shape 62 (the spatial distribution shape of the defect) of the detected defect.

In Step 108, the type of the defect is identified by the method as described above.

In Step 109, the defect type indication 63 corresponding to the type of the defect identified in Step 110 and the image 621 indicating the shape of the defect are displayed together on the display unit 6.

Effects of this Embodiment

In this embodiment, the following effects can be obtained.

In this embodiment, as described above, the control unit 4 for identifying the type of the defect is provided. The control unit 4 is configured to acquire the image 61 representing the vibration state of the inspection target object 7 in the measurement area, based on the measurement result of the measurement unit, detect the discontinuous portion of the vibration state in the measurement area from the image 61 representing the vibration state as the defect 73, and identify the type of the defect, based on at least one of the shape 62 of the detected defect and the vibration state of the detect portion. With this, the control unit 4 automatically identifies the type of the defect, and therefore it is not necessary for the inspector to perform for identifying the type of the defect from the image 61 representing the vibration state. Consequently, even for an unskilled inspector who are not sufficiently knowledgeable about a spatial distribution image of a vibration state, it is possible to easily determine the type of the detected defect from the image 61 representing the vibration state.

Further, in this embodiment, as described above, the control unit 4 is configured to perform control of extracting the area in which the vibration state is discontinuous from the image 61 representing the vibration state as the shape 62 of the defect, identify the type of the defect as a crack in a case where the shape 62 of the defect is linear, and identify the type of the defect as a delamination in a case where the shape 62 of defect is planar. With this, the inspector no longer needs to distinguish the crack and the delamination, facilitating the distinguishment between the crack and the delamination, which enables to recognize the defect. Further, in a case of the delamination, the portion of the rust or the adhesion failure can be presumed from the material and the properties of the inspection target object 7.

Further, in this embodiment, as described above, the control unit 4 performs control for identifying the type of the defect, based on the area and the perimeter of the shape 62 of the extracted defect. As a result, it is possible to easily distinguish between the linear shape and the planar shape, based on the area and the perimeter of the shape of the extracted defect. As a result, the crack and the delamination can be easily distinguished and identified.

In this embodiment, the control unit 4 identifies the type of the defect, based on the ratio of the shape 62 of the extracted defect to the perimeter of the shape 62. Thus, the complexity of the shape 62 of the defect can be recognized from the parameters and/or the indicators represented by the area and the perimeter, such as the circularity (circularity=$4\pi \times$area/(perimeter) 2). Therefore, it is possible to grasp the shape 62 of the defect in more detail. As a result, it becomes easier to identify the type of the defect.

Further, in this embodiment, as described above, the display unit 6 is further provided. The display unit 6 is configured to display the defect type indication 63 representing the type of the defect identified by the control unit 4. The display 63 displays at least one of the image 621 representing the shape of the defect and the image 61 representing the vibration state together. With this, the type of the defect (defect type indication 63) is displayed in conjunction with at least one of the image 621 representing the shape of the defect and the image 61 representing the vibration state. For this reason, it is possible for the inspector to easily grasp the relation between the type of the shape and the image 61 representing the shape 62 of the defect and the vibration state.

Further, in this embodiment, as described above, the image 61 representing the vibration state is a moving image in which the temporal change of the vibration displacement is displayed. With this, when the defect type indication 63 is displayed, the correspondence between the type of the identified defect and the vibration displacement is visually facilitated. Consequently, even for an unskilled inspector, it is possible recognize how the vibration displacement occurs by the type of the defect.

Modified Embodiment

It should be understood that the embodiments disclosed here are examples in all respects and are not restrictive. The scope of the present invention is indicated by the appended claims rather than by the description of the above-described embodiments and includes all modifications (changes) within the meanings and the scopes equivalent to the scope of the claims.

For example, in the above embodiment, the signal generator 5 and the vibrator 1, and the signal generator 5 and the laser illumination unit 2 are connected via a cable (wired), but the present invention is not limited thereto. In the present invention, the signal generator 5 and the vibrator 1, and the signal generator 5 and the laser illumination unit 2 may be wirelessly connected.

In the above-described embodiment, although a speckle-shearing interferometer 3 is used as a measurement unit, the present invention is not limited thereto. In the present invention, the measurement unit may be configured by another optical interferometer.

In addition, in the above-described embodiment, the vibrator 1 in contact with the surface of the inspection target object 7 is used, but the present invention is not limited thereto. In the present invention, a strong speaker or the like placed at a position not touching the surface of the inspection target object 7 may be used as the vibrator 1.

Further, in the present invention, on the optical path until the reflected light from the inspection target object 7 is incident on the image sensor 35, for the purpose of protecting the optical components and improving the SN ratio of the device, etc., windows, or various optical filters may be arranged.

In the above-described embodiment, the condenser lens 34 is arranged between the beam splitter 31 and the image sensor 35, but the present invention is not limited to this arrangement. In the present invention, the condenser lens 34 may be constituted by a plurality of lenses or a plurality of lens groups.

In the above-described embodiment, the type of the defect is identified based on the area and the perimeter of the shape 62 of the defect, but the present invention is not limited thereto. In the present invention, the type of the defect may be identified based on only the area or based on only the perimeter. The present invention may also identify the type of the defect based on a combination in which the area or the perimeter is combined with other elements. In the above-described embodiment, a crack and a delamination are exemplified as the type of the defect to be identified, but the present invention is not limited thereto. The type of the defect may be, for example, floating, a cavity, or poor bonding or the like. Further, by identifying the delamination, it is possible to estimate the presence of rust or corrosion of the underlying layer that caused the delamination.

Figure 6:
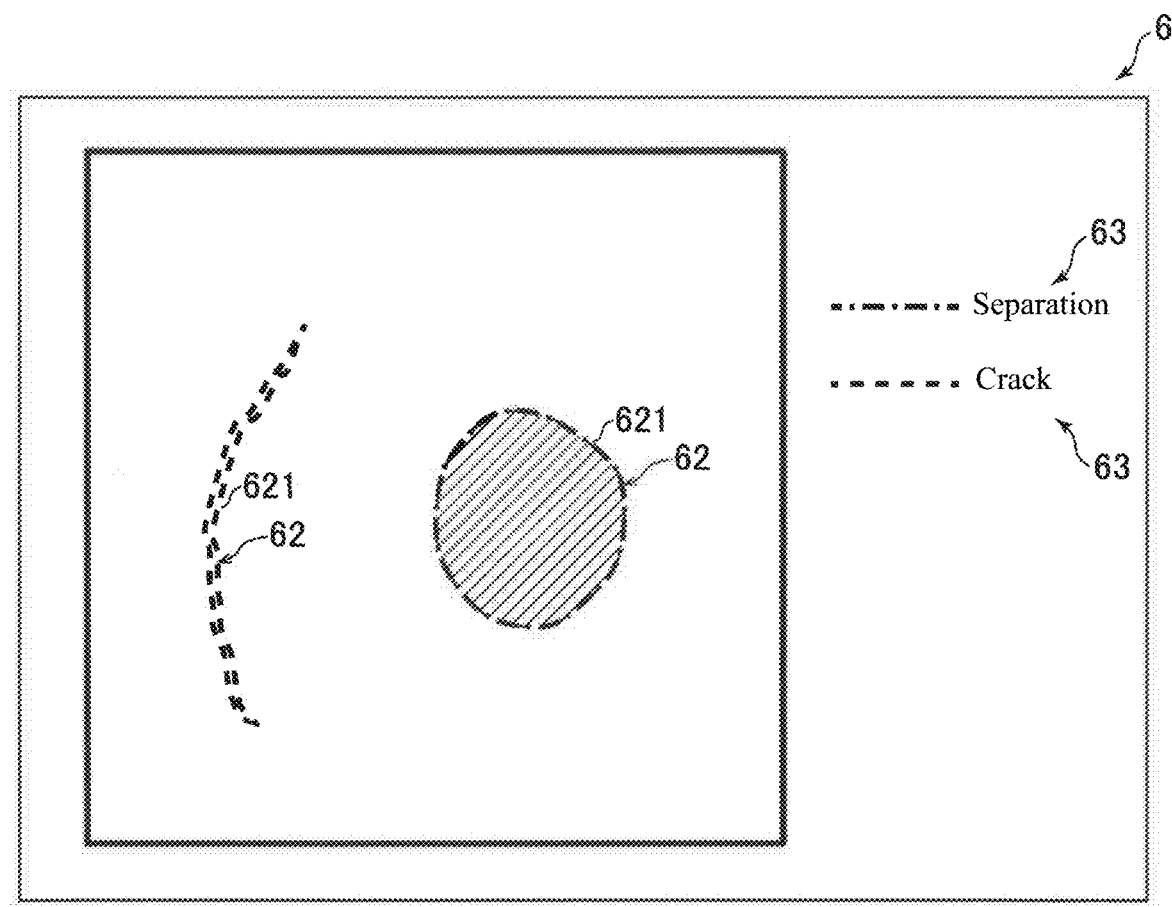
FIG. 6 is a diagram showing an image in which the image of the shape of the defect and the image of the defect type indication displayed on a display are combined according to a modification of one embodiment of the present invention.

Further, in the above-described embodiment, the defect type indication 63 is displayed as letters/characters, but the present invention is not limited thereto. In the present invention, as in a modification shown in FIG. 6, the type of the defect may be shown by changing the line representing the perimeter of the image 621 indicating the shape of the defect for each type of the delamination, such as, e.g., the alternate long and short dash line in a case where the type of the defect is a delamination and the broken line in a case where the type of the defect is a crack. Further, in the present invention, the type of defect may be displayed by assigning a color to each type of the defect to identify the shape 62 of the defect.

In the above-described embodiment, the defect type indication 63 indicating the type of the defect and the image 621 indicating the shape of the defect are displayed in a combined manner, but the present invention is not limited thereto. In the present invention, it may be displayed such that the defect type indication 63 and the image representing the vibration state are displayed in a combined manner or may be displayed such that the defect type indication 63, the image 621 representing the shape of the defect, and the image 61 representing the vibration state may be displayed in a combined manner. Further, in the present invention, without displaying by combining them, it may be configured such that a plurality of screens are displayed side by side on the display unit 6 and the defect type indication 63, the image representing image 621 representing the shape of the defect, and the image 61 representing the vibration state are displayed on separate screens, respectively.

Further, in the above-described embodiment, for convenience of explanation, the processing operation of the control unit 4 of the present invention has been described using the flowchart of the flow-driven type that performs processing in order along the processing flow, but the present invention is not limited thereto. In the present invention, the processing operation by the control unit 4 may be performed by an event-driven type processing that executes processing on an event-by-event basis. In this case, the processing of the control unit may be performed in a complete event-driven fashion or in combination of event-driven type processing and flow-driven type processing.

DESCRIPTION OF SYMBOLS

1: Vibrator (excitation unit)
2: Laser illumination unit (illumination unit)
3: Speckle-shearing interferometer (measurement unit)
4: Control unit
6: Display unit
7: Inspection target object
61: Image representing vibration state
62: Shape of defect
63: Defect type indication
621: Image indicating a shape of a defect

The invention claimed is:

1. A defect inspection apparatus comprising:
an excitation unit configured to excite elastic waves in an inspection target object;
an irradiation unit configured to emit laser light to a measurement area of the inspection target object in a state in which the elastic waves are excited by the excitation unit;
a measurement unit configured to cause the laser light reflected at mutually different positions in the measurement area to interfere with each other to acquire interference light and measure the interference light; and
a control unit, the control unit being configured to
acquire an image representing a vibration state of the inspection target object in the measurement area based on a measurement result of the measurement unit,
detect a discontinuous portion in the vibration state in the measurement area from the image representing the vibration state as a defect, and
identify a type of the defect based on at least one of a shape of the detected defect and the vibration state of a defective portion,
wherein the image representing the vibration state is a moving image in which a temporal change of a vibration displacement is displayed.

2. The defect inspection apparatus as recited in claim 1, wherein the control unit is configured to
extract an area where the vibration state is discontinuous from the image representing the vibration state as a shape of the defect,
identify a type of the defect as a crack in a case where the shape of the defect is linear, and
identify a type of the defect as a delamination in a case where the shape of the defect is planar.

3. The defect inspection apparatus recited in claim 2, wherein the control unit identifies the type of the defect based on an area and a perimeter of the shape of the extracted defect.

4. The defect inspection apparatus as recited in claim 3, wherein the control unit identifies the type of the defect based on a ratio of the area of the shape of the extracted defect to the perimeter of the shape of the extracted defect.

5. The defect inspection apparatus as recited in claim 1, further comprising:
a display unit configured to display a defect type indication indicating the type of the defect identified by the control unit,
wherein the display unit displays at least one of an image representing the shape of the defect and an image indicating the vibration state together with the defect type indication.

6. A defect inspection method comprising:
exciting elastic waves in an inspection target object;
emitting laser light to a measurement area of the inspection target object in a state in which the elastic waves are excited;
causing the laser light reflected at mutually different positions in the measurement area to interfere with each other to acquire interference light and measuring the interference light;
acquiring a moving image in which a temporal change of a vibration displacement is displayed as an image representing a vibration state of the inspection target object in the measurement area based on a measurement result;

detecting a discontinuous portion in the vibration state in the measurement area from the moving image in which the temporal change of the vibration displacement is displayed as a defect; and identifying a type of the defect based on at least one of a shape of the detected defect and the vibration state of a defective portion.

\* \* \* \* \*